United States Patent [19]
Luthman et al.

[11] 3,858,809
[45] Jan. 7, 1975

[54] LIQUID MANURE TANK SPREADING ROTOR

[75] Inventors: Paul A. Luthman, New Bremen; Thomas R. Fischer, Wapakoneta, both of Ohio

[73] Assignee: Avco Corporation, Coldwater, Ohio

[22] Filed: Nov. 2, 1973

[21] Appl. No.: 412,262

[52] U.S. Cl. ................................ 239/684, 239/687
[51] Int. Cl. ............................................. A01c 19/00
[58] Field of Search ........... 239/146, 172, 681, 684, 239/687, 688, 662; 222/148, 410

[56] References Cited
UNITED STATES PATENTS

| | | | |
|---|---|---|---|
| 3,279,801 | 10/1966 | Meyer | 239/687 |
| 3,510,066 | 5/1970 | Swenson | 239/687 X |
| 3,666,184 | 5/1972 | Beshgetoor | 239/687 X |
| 3,682,394 | 8/1972 | Shivvers | 239/687 X |
| 3,790,090 | 2/1974 | Lovenc et al. | 239/684 X |

*Primary Examiner*—M. Henson Wood, Jr.
*Assistant Examiner*—Michael Mar
*Attorney, Agent, or Firm*—Charles M. Hogan; Eugene C. Goodale

[57] ABSTRACT

A liquid manure spreader has an aft lower opening in a tank to feed a spreading rotor for distribution of liquid manure in a spray pattern. The spreading rotor housing is pivotally mounted to the tank so that it may be swung down for cleaning after use. This eliminates residual manure that can freeze during overnight out of doors storage. The rotor housing has a stepped opening to insure a uniform spray pattern. In an alternate embodiment the rotor feeds tangential pipes which deliver the liquid manure for injection directly into the ground.

15 Claims, 8 Drawing Figures

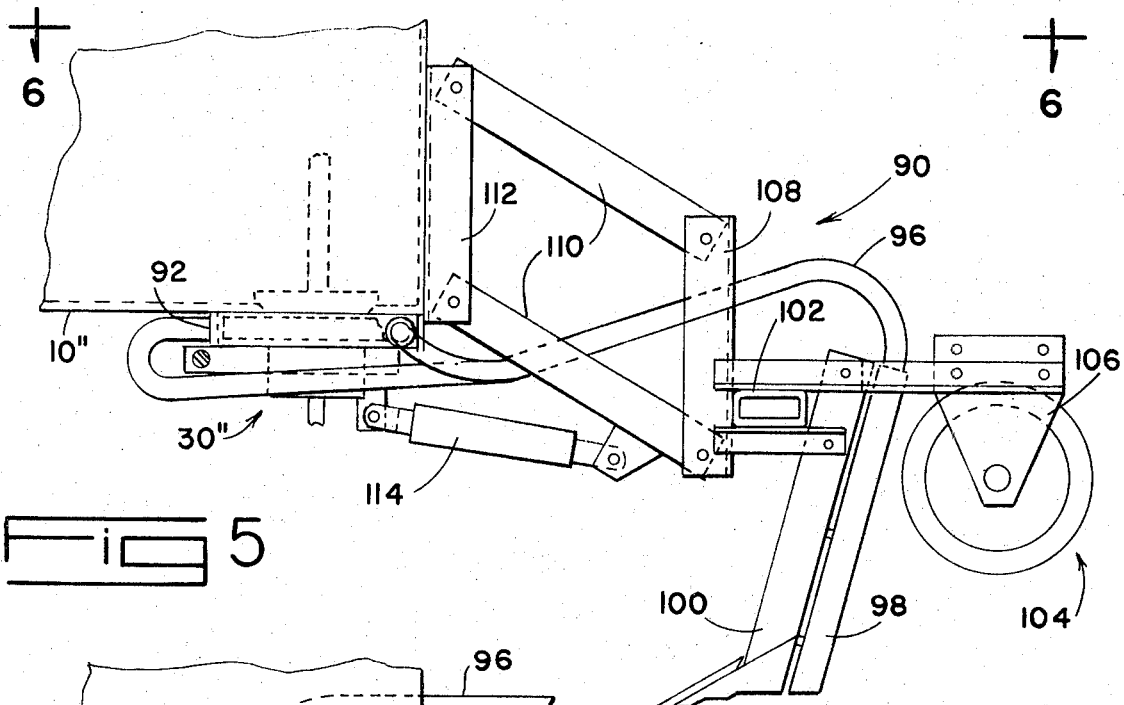
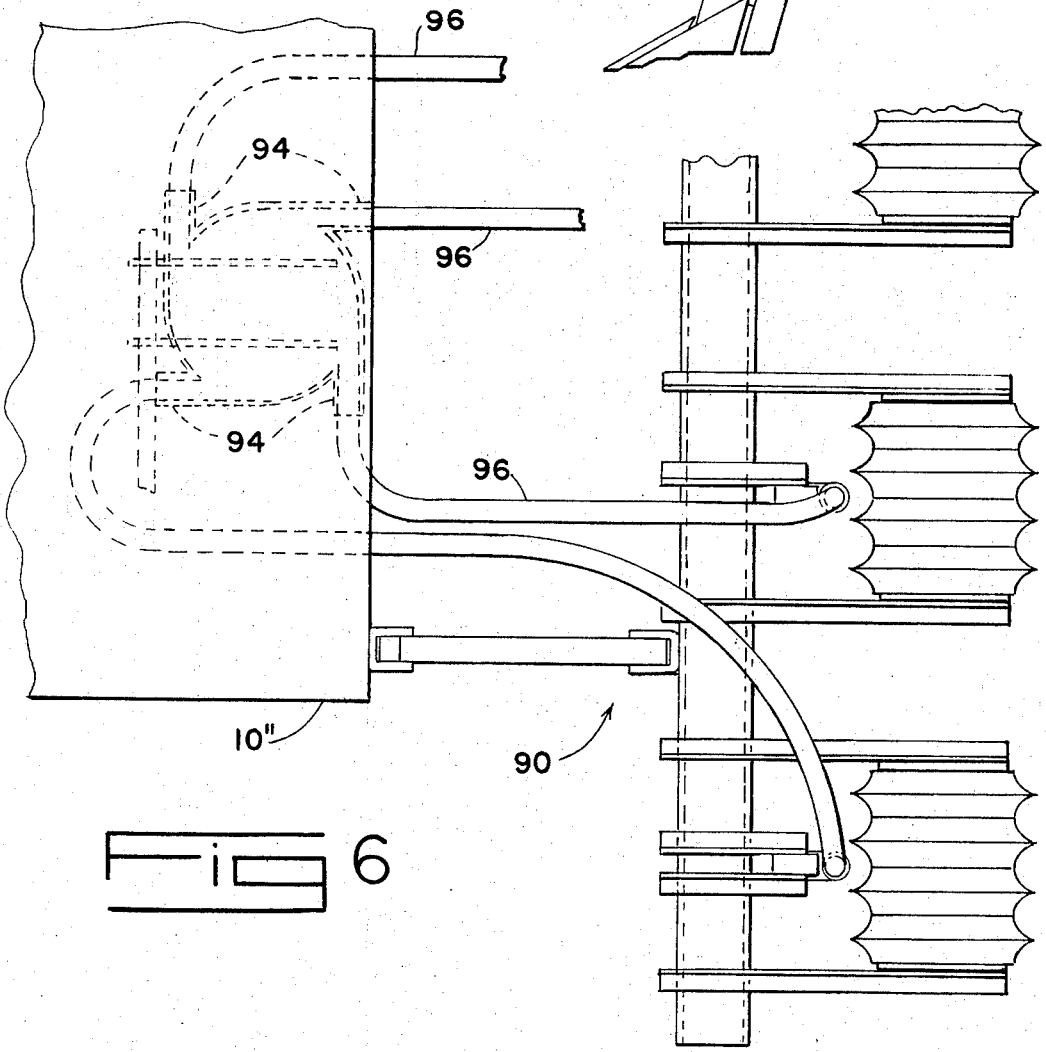

LIQUID MANURE TANK SPREADING ROTOR

The present invention relates to manure spreaders and more particularly to manure spreaders of the liquid type.

Liquid manure spreaders have been used for some time to distribute manure in liquid form as a fertilizer. These spreaders generally consist of a tank supported on wheels for movement across a field. A distributing mechanism controls the discharge liquid manure from the aft end of the tank. In one type of spreader the tank is pressurized by a pump and the liquid manure ejected through a spray nozzle. In another form the liquid manure is permitted to drop by gravity to a driven rotor for distribution of the manure in a spray pattern.

Both of these approaches are quite effective in distributing manure. However, the rotor-type spreader encounters a problem when it is used in climates that experience overnight subfreezing temperatures. With present rotor design a residual of manure stays in the tank and rotor even after flow from the tank has been shut off. This accumulation tends to freeze overnight. When the spreader is operated the next morning the rotor may be frozen in position and engagement of the drive for the rotor can cause damage to the drive train.

These problems are overcome by the present invention with a liquid manure spreading rotor which is pivotally mounted to the aft end of a liquid manure tank. The rotor is held between a horizontal position during which it distributes liquid manure and a vertical position in which excess liquid manure is permitted to be dropped to the ground.

The above and other related features of the present invention will be apparent from a reading of the following description of the disclosure found in the accompanying drawings and the novelty thereof pointed out in the appended claims.

In the drawings:

FIG. 5 is a fragmentary side view of still another embodiment of the present invention;

FIG. 6 is a plan view of the liquid manure spreading rotor shown in FIG. 5, taken on line 6—6 of FIG. 5;

Figure 1:
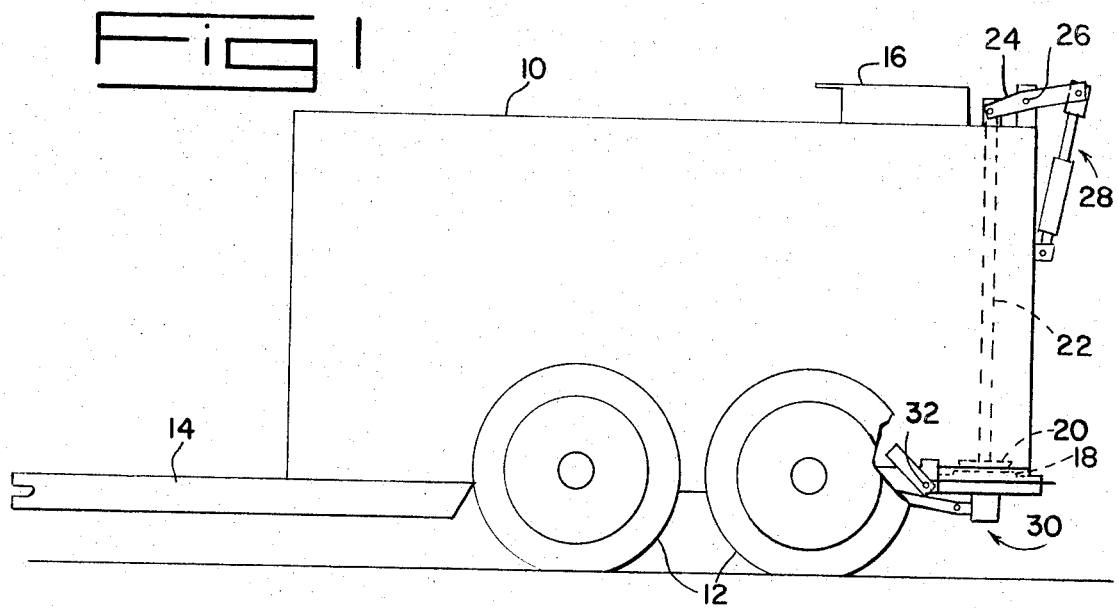
FIG. 1 is a highly simplified elevational view of a liquid manure spreader embodying the present invention.

Referring to FIG. 1, there is shown a liquid manure spreader which comprises a tank 10 supported for ground movement by wheels 12. The tank has a yoke 14 which may be suitably connected to a tractor for pulling the spreader along the ground.

The tank 10 has an upper opening 16 which permits liquid manure to be loaded into the tank 10. The tank 10 has a lower aft housing 18 with a central opening that is selectively closed and opened by a plug 20 supported at the lower end of an actuating rod 22 extending through the upper portion of the tank 10. The upper end of rod 22 is connected to an actuating arm 24 pivotally connected to the tank 10 at 26. The other end of arm 24 is connected to a hydraulic actuator 28. Extension or retraction of the actuator 28 by a suitable hydraulic control system (not shown in this figure) causes the plug 20 to either cover or uncover opening 28. This prevents or permits flow of liquid manure from the bottom of tank 10.

A liquid manure spreading rotor, indicated at 30, is pivotally mounted to the tank 10 at a pivotal support shaft 32 so that it can be swung down for cleaning out of residual manure, as described in detail below.

Figure 2:
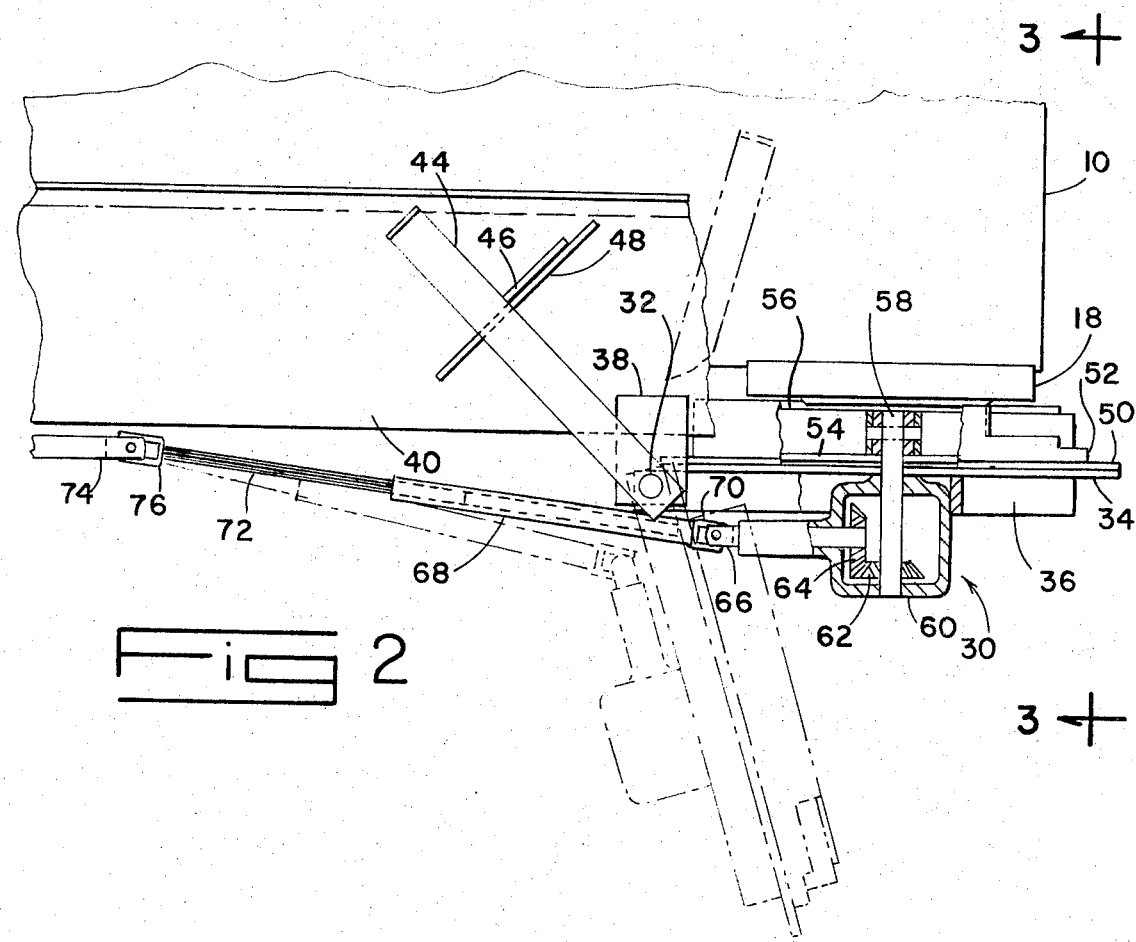
FIG. 2 is an enlarged fragmentary view of the liquid manure spreader showing one form of driving the liquid manure spreader rotor which embodies the present invention.
Figure 3:
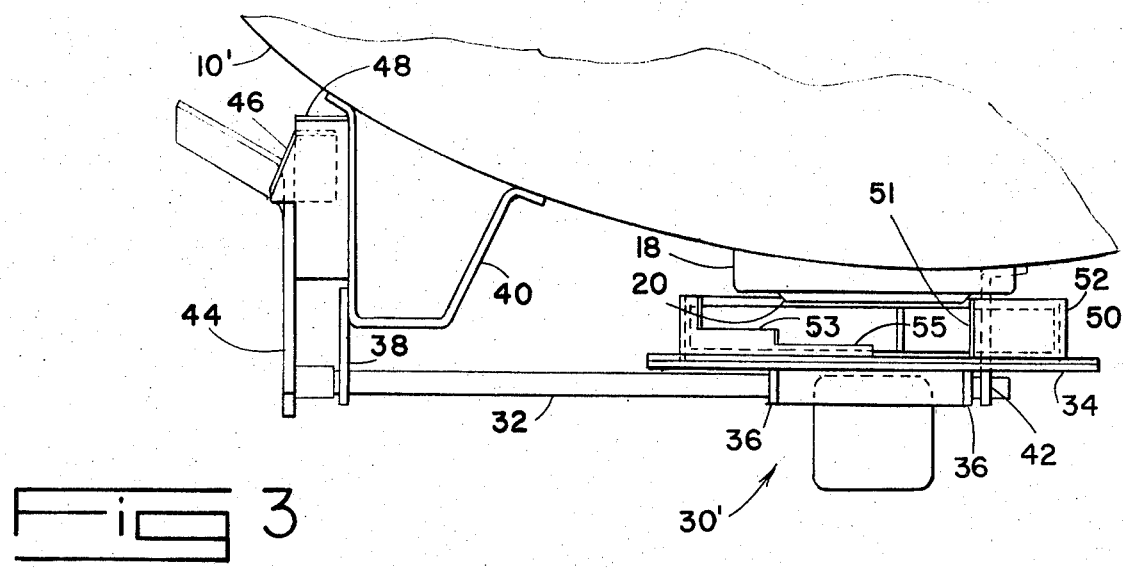
FIG. 3 is an end view of the liquid manure spreader rotor, taken on line 3—3 of FIG. 2.

Referring to FIGS. 2 and 3, the liquid manure spreading rotor comprises a circular plate 34 having support bars 36 extending forward to the pivotal support shaft 32 and fixed to this shaft. The outboard end of support shaft 32 is journaled relative to the tank 10 by plate 38 on a bracket 40 secured to tank 10. An inner arm 42 secured to the tank adjacent housing 18 journals the inboard end of shaft 32. An operator-actuating arm 44 is secured to the outboard end of shaft 32. As shown in FIG. 2, the arm 44 is latched into the position illustrated by solid lines by a ramp 46 secured to a plate 48 on bracket 40. The arm 44 has sufficient flexibility to permit it to be moved beyond the end of ramp 46 so that it may permit the spreading rotor 30 to be swung into the position shown in phantom in FIG. 2.

Plate 34 has a flange 50 secured to it which in turn mounts a circular ring 52. An opening 51 is provided in the aft end of the ring 52 for distribution of liquid manure from the rotor 30 (see particularly FIG. 3). Stepped sections 53 and 55 insure a uniform spray pattern, as described below.

Ring 52 encloses a rotor which consists of a plate 54 having a plurality of generally radially extending vanes 56. Vanes 56 and plate 54 are secured to a central shaft 58 which extends downward through circular plate 34 and is journaled in a right angle gear box 60. A bevel gear 62 on shaft 58 meshes with a bevel gear 64 on an output shaft 66. Output shaft 66 connects to a tubular drive shaft 68 through a universal joint 70. Tubular drive shaft 68 has internal splines which receive an external splined drive shaft 72 connected to a horizontal drive shaft 74 through a universal joint 76. Shaft 74 extends to the forward end of the manure spreader for suitable connection to the PTO of a tractor or other power source.

Figure 4:
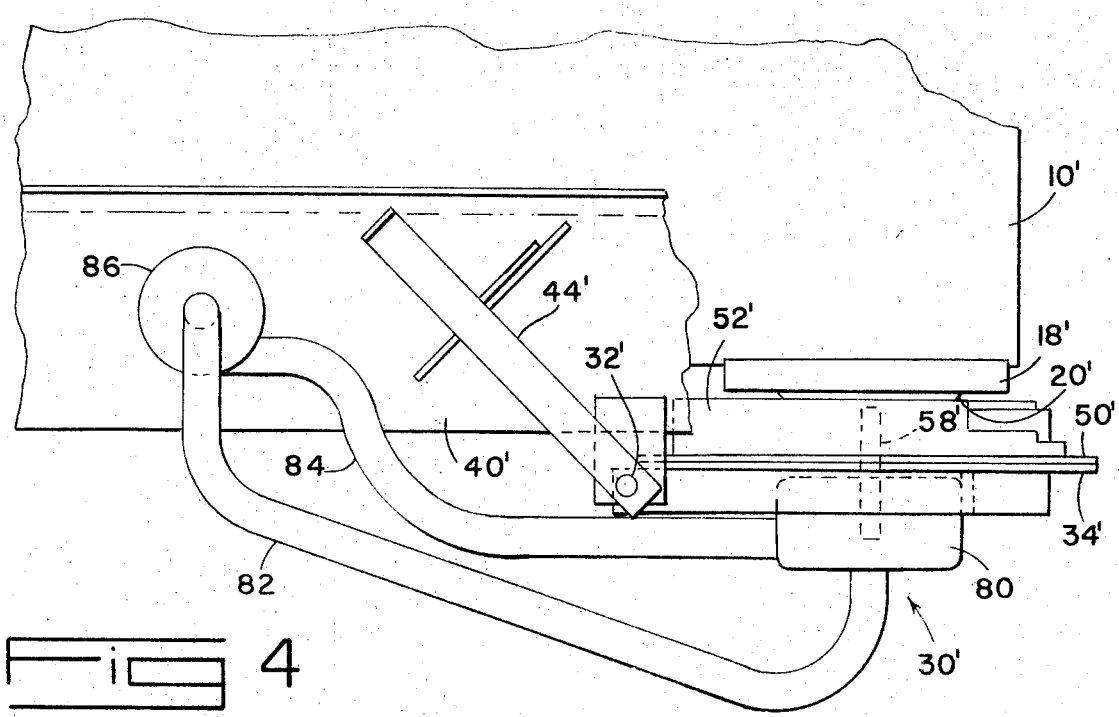
FIG. 4 is an enlarged fragmentary side view of a liquid manure spreader rotor embodying an alternate form of the present invention.

FIG. 4 illustrates an alternate embodiment of the spreading rotor which utilizes a hydraulically driven rotor instead of a mechanically driven rotor. In this arrangement the rotor shaft 58' is driven by a suitable hydraulic motor 80 connected to circular plate 34'. Motor 80 has flexible hydraulic lines 82 and 84 which extend to a hydraulic pump 86 shown in schematic fashion. When it is desired to operate the rotor assembly, hydraulic fluid is delivered from pump 86 to the motor 80 for rotation of shaft 58.

Referring to FIGS. 5 and 6, the rotor assembly instead of distributing the manure in a spray pattern is adapted to deliver it to a "plow-down" assembly, generally indicated at 90. In this embodiment the spreading rotor has an outer housing 92 which completely surrounds the rotor and which may or may not be sealingly secured against opening 18 of tank 10". This outer housing 92 has a plurality of tangential outlet tubes 94 connecting with flexible distribution conduits 96. Distribution conduits 96 extend to injection tubes 98 secured to the aft end of a plow assembly 100 secured to a tool bar 102 at given spaced intervals. A roller asssembly 104 is journaled to a bracket 106 aft of the plow assembly 100 to cover up the resultant furrow made by the plow 100, as described later. A coulter asssembly (not shown) may also be used to assist in making the furrow. Tool bar 102 is supported by a pair of spaced vertical bars 108 (only one shown) connected at either end to upper and lower parallel links 110 pivotally connected to the ends of support brackets 112 on tank 10". A linear hydraulic actuator 114 is connected between the tank 10" and the lower links 110. The actuator 114 is connected to a suitable hydraulic supply system so that the plow-down attachment 90 may be elevated to a transport position or lowered to an operating position.

Figure 7:
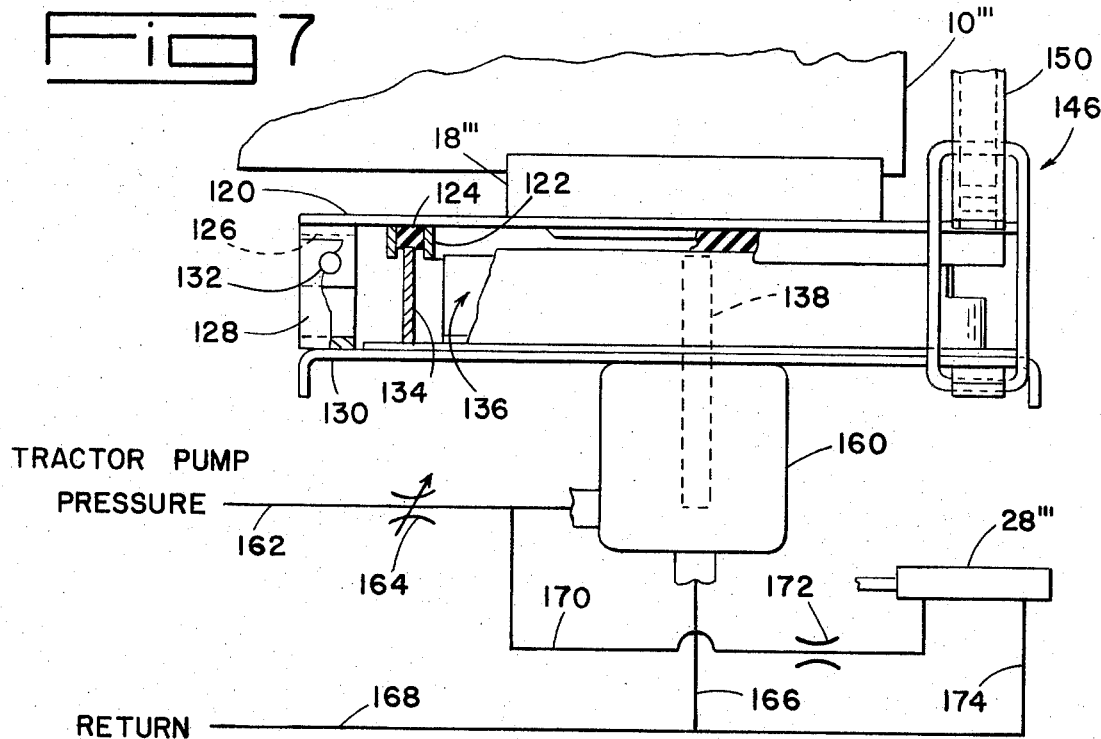
FIG. 7 is an enlarged fragmentary side view of another rotor embodying the present invention, along with a hydraulic control system with which it may be used.
Figure 8:
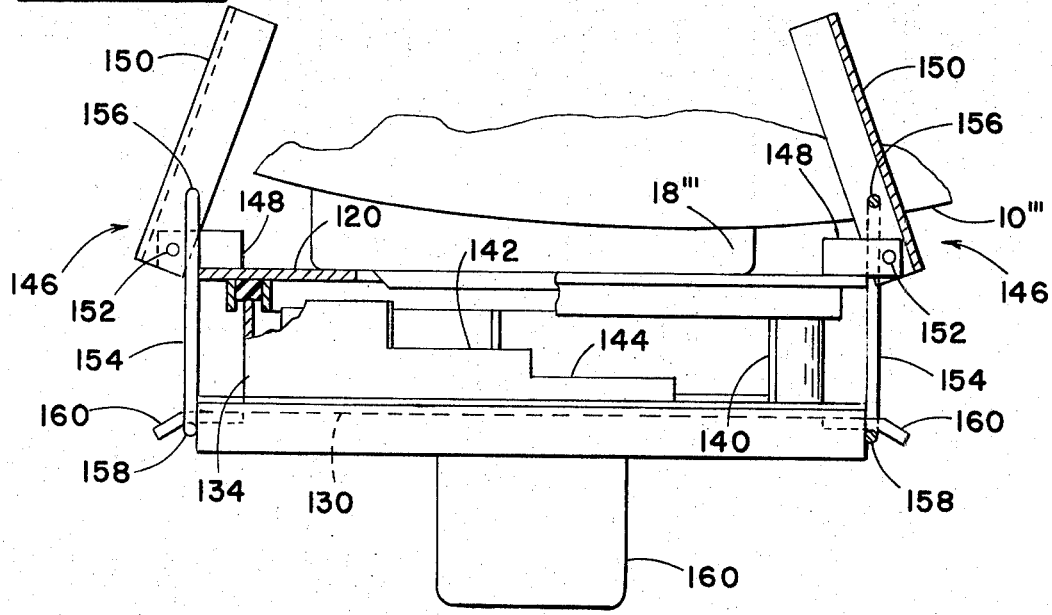
FIG. 8 is an aft end view of the rotor of FIG. 7, taken on line 8—8 of FIG. 7.

FIGS. 7 and 8 show another embodiment in which the spreader rotor housing is sealed against the opening of the tank 10'''. In this arrangement a horizontal plate 120 is secured to the bottom of housing 18''' as by welding. A pair of inner and outer circular rings 122 extend downward from plate 120 and receive between them a resilient annular gasket 124.

One end of plate 120 has a pair of tabs 126, pivotally mounting tabs 128 on a lower plate 130 through pins 132. Lower plate 130 has a ring 134 which encloses rotor assembly 136 mounted on shaft 138. Ring 134 has an aft opening 140 with a series of steps 142 and 144 to provide a uniform spray distribution of manure, as in the previous embodiments of the invention.

Plate 130 is releasably held in the illustrated horizontal position by latch assemblies 146. In this position the upper edge of ring 134 abuts gasket ring 124. Latch assemblies 146 comprise tabs 148 secured to plate 120. Arms 150 are pivotally secured to tabs 148 by pins 152. Loop-type links 154 are pivotally secured to arms 150 at 156 and have lower sections 158 adapted to be received under tabs 160 on plate 130. As particularly illustrated in FIG. 8, arms 150 are swung inboard so that point 156 is inboard of the pin 152 thereby forming an over-center lock to hold the plate 130 in the illustrated horizontal position. To release the rotor housing the arms 150 are swung outboard to lower links 154. Links 154 are swung free of tabs 160 and the plate 130 permitted to swing down to a near vertical position. Although not shown, a chain connected to the aft end of plate 130 and a hook on plate 120 or tank 10''' may be used to assist in lowering or raising the rotor housing.

Shaft 138 is driven by a hydraulic motor 160 which receives pump pressure from a tractor hydraulic system through a supply conduit 162. A variable area restriction 164 is provided in line 162 to vary the flow of fluid and thus the speed of the motor 160. Conduits 166 and 168 extend from the motor 160 to the return of the tractor hydraulic system. This system may also be hooked up to actuator 28''' to selectively cover and uncover the aft rear opening in the tank in synchronism with operation of the motor 160. To do this a supply conduit 170 extends from line 162 to the actuator 28'''. A fixed orifice restriction 172 is provided in conduit 170 so as to limit the rate of flow into one end of the actuator 28'''. A second conduit 174 extends from the opposite end of the actuator 28''' to conduit 168.

In operation the manure-spreading rotor of FIGS. 2 and 3 is driven by the power-take-off unit of a tractor that will pull the liquid manure spreader through a field. As is evident from FIG. 2, the amount of offset of the drive shaft 66 relative to shaft 74 is relatively small so that a minimum of wear is experienced on the universal joints 76 and 70. As the liquid manure falls to the rotor by gravity and is moved to the discharge opening 51 by the rotor vanes 56, the steps 53 and 55 permit a uniform distribution of manure in a fan-type spray pattern.

The reason for this uniform distribution is that in the absence of a stepped section, manure coming out of the opening 52 would tend to be concentrated at the left end of the opening, as viewed in FIG. 3, since the direction of movement of the vanes 56 is left to right. By placing the steps 53, 55 in the opening, the tendency of the manure to accumulate at that side is prevented. It should be apparent that other shapes and even a smooth curved shape could be employed to achieve a particular spray distribution.

When the spreading of manure is terminated and the unit is to be stored for the night, plug 20 is placed in a position to allow flow to the rotor 30. Lever 44 is then flexed to swing it out beyond ramp 46 and thus permit the shaft 32 to pivot so that the spreading rotor is in the position illustrated in phantom lines in FIG. 2. In this position any manure that remains in the tank and spreading rotor housing falls to the ground. Also, this position permits the rotor housing to be suitably cleaned off. As is particularly apparent in FIG. 2, the universal joints 70, 76 permit the acute bending of the drive train between the gearbox housing 60 and the shaft 74. Since the shafts are not rotating in this position there is substantially no strain. The decrease in distance between the shaft 74 and shaft 66 is accommodated because the shafts 72 and 68 telescope into one another. The next day the arm 44 is swung to its latched position so that the rotor will be in an operational condition.

The embodiment of FIG. 4 permits the swinging down of the rotor housing, since the hydraulic lines 82 and 84 are flexible. This embodiment has the same advantages of the one shown in FIGS. 1 and 2, since it permits clean-out of the manure after operation.

The embodiment of FIGS. 5 and 6 also permits the shaft 32 to pivot and place the rotor housing in a position for cleaning. This is particularly important for a plow-down unit in which the manure travels through closed lines to be injected into the ground. Freezing of manure in the lines would be particularly troublesome and the ability to clean the rotor housing after use greatly minimizes if not eliminates this problem.

The embodiment of FIGS. 7 and 8 operates in a fashion similar to the previous embodiments except that the rotor housing is sealed against the bottom of the tank 10'''. It is easily lowered and raised to permit cleaning by the latch assemblies 146.

When the tractor pump pressure is applied to conduit 162 it flows through variable orifice 164 at a preselected rate. The resistance to flow into the motor 160 is substantially less than that through conduit 170 to actuator 28. As a result, the motor 160 begins turning shaft 138 substantially before the plug is removed from the opening in tank 10''' and before manure drops into the rotor housing 134.

The opening 140 has a stepped configuration to permit uniform distribution in a spray pattern. In addition, it is biased to one side of the center line of the tank 10''' to spray on one side. This keeps the wheels of the tank out of the distributed manure during the next pass through the field.

While several preferred embodiments of the present invention have been described, it should be apparent to those skilled in the art that it may be modified to include still further forms of the invention without departing from its spirit and scope.

Having thus described the invention what is claimed as novel and desired to be secured by Letters Patent of the United States is:

1. A liquid manure spreader comprising:

a tank mounted for ground movement and being fillable with liquid manure;

means for controlling flow of liquid manure from the bottom of said tank;

a rotor comprising an annular housing and a rotatable rotor element for distributing liquid manure radially outward, said rotor having means permitting distribution of said liquid manure from said housing;

means for driving said rotor, said means including a rotary mechanical interconnection between a point on said tank and said rotor, the drive train between said points being flexible to permit said rotor housing to be swung down; and means for pivotally mounting said rotor assembly between a first position in which the plane of rotation of said rotor element is generally underneath said flow control means on said tank and a second position wherein said rotor housing is swung away from said flow control means for cleaning out residual manure in said tank and rotor housing.

2. A liquid manure spreader as in claim 1 wherein said rotor driving means comprises:

a hydraulic motor mounted on said rotor housing and having a rotary output shaft connected to said rotor element;

a hydraulic pump positioned at a point remote from said hydraulic motor; and hydraulic lines interconnecting said hydraulic pump and motor, said hydraulic lines being flexible at least in the area adjacent said rotor housing so as to permit said rotor housing to be swung downward.

3. A liquid manure spreader as in claim 1 wherein said mechanical drive comprises:

a power input shaft journaled for rotation on said tank about a generally horizontal axis;

a right-angle gearbox mounted on said rotor housing and having one shaft driving said rotor element and the other extending generally parallel to said input drive shaft when the rotor housing is in its first position underneath said flow control means; and a flexible shaft assembly interconnecting said drive shaft and said right-angle gearbox permitting said rotor element to be driven in said first position and permitting free swinging of said rotor housing to said second position.

4. A liquid manure spreader as in claim 3 wherein said flexible shaft assembly comprises:

a shaft comprising inner and outer elements telescoped into one another and having mutually engaging splines so that the elements are restrained from rotating relative to one another but are permitted to slide, thereby varying the axial length thereof; and universal joints respectively connecting one of the elements to the shaft on said tank and the other elements to the shaft on said gearbox.

5. A liquid manure spreader as in claim 1 wherein said means for pivotally mounting said rotor housing comprises:

a shaft secured to said rotor housing and extending to the side of said tank;

means for journaling said shaft relative to said tank to permit swinging of said rotor housing;

an arm extending radially from the end of said shaft to the side of said tank, said lever having a slight degree of flexibility in a direction parallel to the axis of said shaft; and a latch in the path of movement of said arm, said latch having a ramp and a notch adjacent the ramp whereby the arm is received and held in said notch for maintaining said rotor housing in said first position, said arm being movable out of said notch to permit said rotor housing to be swung downward to said second position.

6. A liquid manure spreader as in claim 1 further comprising:

mating annular surfaces on the bottom of said tank and the upper perimeter of said rotor housing permitting sealing engagement of said rotor housing with said tank in said first position; and means for latching said rotor housing in said first position.

7. A liquid manure spreader as in claim 6 wherein said latch means comprises at least one over-center latch for interconnecting the rotor housing to said tank at a point remote from the pivotal mounting for said rotor housing.

8. A liquid manure spreader as in claim 1 wherein said rotor element rotates in a given direction and wherein said housing defines a discharge opening and in which said opening has a series of predetermined steps so that the flow discharge area increases in the direction of movement of the rotor element relative to said opening.

9. A liquid manure spreader as in claim 8 wherein said rotor element comprises a plate and a plurality of bars extending radially outward from said plate.

10. A liquid manure spreader as in claim 1 adapted for direct injection into the ground wherein:

said means for distributing said manure comprises a plurality of tangential tubelike outlets formed in the outer periphery of said rotor housing; and said liquid manure spreader further comprises means for directly injecting liquid manure into the ground and including flexible conduits extending from said rotor housing tangential outlets to a discharge point.

11. A liquid manure spreader as in claim 1 wherein said flow control means comprises:

a plunger positioned adjacent the bottom of said tank and receivable in an opening in the bottom of the tank to prevent flow therefrom;

a shaft extending vertically from said plunger through an upper opening in said tank; and means for selectively vertically displacing said shaft so as to permit and block flow from said tank.

12. A liquid manure spreader as in claim 11 wherein said selective displacing means comprises a hydraulic actuator having its output connected to said plunger for displacement of said shaft.

13. A liquid manure spreader as in claim 12 further comprising:
- a hydraulic motor having a rotary output shaft connected to said rotor element;
- a control system having a source of pressurized hydraulic fluid and positioned at a location remote from said motor housing;
- hydraulic lines interconnecting said system and said motor and said actuator, said control system delivering hydraulic fluid to said rotor housing before said actuator is energized, thereby initiating rotation of said rotor before said flow control means permits flow into said rotor housing.

14. A liquid manure spreader as in claim 13 wherein said hydraulic lines connect said motor and actuator in parallel to said control system and said control system comprises a flow restricting orifice in the line to said actuator.

15. A liquid manure spreader as in claim 14 wherein said control system further comprises a variable area orifice in the hydraulic line connected to both said motor and said actuator.

* * * * *